United States Patent
Kimura et al.

(10) Patent No.: US 7,760,467 B2
(45) Date of Patent: Jul. 20, 2010

(54) SUBSTRATE FOR MAGNETIC RECORDING MEDIUM, MAGNETIC RECORDING MEDIUM, AND MAGNETIC RECORDING APPARATUS

(75) Inventors: Kaori Kimura, Tokyo (JP); Masatoshi Sakurai, Tokyo (JP); Akira Kikitsu, Yokohama (JP); Yoshiyuki Kamata, Tokyo (JP); Satoshi Shirotori, Tokyo (JP); Hiroyuki Hieda, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 1107 days.

(21) Appl. No.: 11/397,892

(22) Filed: Apr. 5, 2006

(65) Prior Publication Data

US 2007/0053107 A1    Mar. 8, 2007

(30) Foreign Application Priority Data

Sep. 2, 2005    (JP)    ............... 2005-254336

(51) Int. Cl.
  *G11B 5/82* (2006.01)
(52) U.S. Cl. .................................................. 360/135
(58) Field of Classification Search ................. 360/133, 360/135
  See application file for complete search history.

(56) References Cited

U.S. PATENT DOCUMENTS

| 4,084,201 | A | * | 4/1978 | Hack et al. ................... 360/135 |
| 4,513,333 | A | * | 4/1985 | Young et al. .............. 360/77.02 |
| 4,961,123 | A | * | 10/1990 | Williams et al. ............ 360/131 |
| 5,067,039 | A | * | 11/1991 | Godwin et al. .............. 360/135 |
| 5,120,927 | A |   | 6/1992 | Williams et al. |
| 5,774,313 | A | * | 6/1998 | Tanaka et al. ............... 360/135 |
| 6,084,754 | A | * | 7/2000 | Smith et al. ................. 360/135 |
| 6,309,802 | B1 | * | 10/2001 | Bar-Gadda .................. 430/321 |
| 7,247,343 | B2 |   | 7/2007 | Suwa et al. |
| 2005/0048198 | A1 |   | 3/2005 | Suwa et al. |
| 2005/0128641 | A1 | * | 6/2005 | Shiratori ..................... 360/131 |

FOREIGN PATENT DOCUMENTS

| JP | 02-031387 | | 2/1990 |
| JP | 10293914 A | * | 11/1998 |
| JP | 2000195200 A | * | 7/2000 |

(Continued)

OTHER PUBLICATIONS

"Triangular Propagation Patterns for Contiguous Disk Magnetic Bubble," Oct. 1, 1980, IBM Technical Disclosure Bulletin, vol. No. 23, iss. No. 5, p. No. 2122.*

(Continued)

*Primary Examiner*—William J Klimowicz
(74) *Attorney, Agent, or Firm*—Nixon & Vanderhye, PC

(57) ABSTRACT

It is possible to improve the recording and reproducing S/N ratio, the reproduction signal intensity, and the degree of high density recording. There are provided a plurality of recording tracks formed on a substrate, each recording track being formed of a magnetic material, and non-recording sections formed on the substrate, each non-recording section separating adjacent recording tracks, each recording track including a plurality of recording sections and connecting sections for connecting the recording sections adjacent thereto in a track longitudinal direction, and each connecting section having a cross-sectional area in a track width direction that is smaller than a cross-sectional area in a track width direction of adjacent recording sections.

10 Claims, 18 Drawing Sheets

FOREIGN PATENT DOCUMENTS

| | | |
|---|---|---|
| JP | 2000-251236 | 9/2000 |
| JP | 2003-016621 | 1/2003 |
| JP | 2003-317222 | 11/2003 |
| JP | 2005-071542 | 3/2005 |

OTHER PUBLICATIONS

"Staggered Ratchet Shaped Propagation Patterns for Contiguous Disk Magnetic Bubble Devices," Jun. 1, 1981, IBM Technical Disclosure Bulletin, vol. No. 24, iss. No. 1B, p. No. 677.*

"Discrete Magnetic Tracks in Storage Disks," Nov. 1, 1981, IBM Technical Disclosure Bulletin, vol. No. 24, iss. No. 6, p. Nos. 2794-2795.*

Saitoh et al., *Domain-wall trapping in a ferromagnetic nanowire network*, Journal of Applied Physics, vol. 93, No. 10, May 15, 2003, pp. 7444-7446.

Office Action in Japanese Patent Application No. 2005-254336, dated Dec. 18, 2009, and English-language translation.

Office Action in Japanese Patent Application No. 2005-254336, dated May 18, 2010, and English-language translation.

* cited by examiner

A-A SECTION though the head flying height of a recording and reproducing head should be lowered in order to improve the recording efficiency, it is difficult to decrease the flying height, and a number of smoothing steps are required when a patterned medium, which has a number of projections and depressions, is used.

SUBSTRATE FOR MAGNETIC RECORDING MEDIUM, MAGNETIC RECORDING MEDIUM, AND MAGNETIC RECORDING APPARATUS

CROSS-REFERENCE TO RELATED APPLICATION

This application is based upon and claims the benefit of priority from prior Japanese Patent Application No. 2005-254336, filed on Sep. 2, 2005 in Japan, the entire contents of which are incorporated herein by reference.

BACKGROUND OF THE INVENTION

1. Field of the Invention

The present invention relates to an uneven substrate for manufacturing a magnetic recording medium capable of performing high-density recording, a method of manufacturing such an uneven substrate, a magnetic recording medium and a method of manufacturing a magnetic recording medium, and a magnetic recording apparatus including such a magnetic recording medium.

2. Background Art

A hard disk drive is a recording apparatus including a housing and a magnetic disk provided within the housing. The magnetic disk is formed by depositing a film of a magnetic material (magnetic film) on a glass substrate. A magnetic film is composed of fine particles each having magnetic domains. Between records, noise is generated in accordance with the particle size. In order to achieve high density recording, the size of magnetic domains of a magnetic recording medium, which is the information recording unit, should be made smaller.

However, if the size of magnetic domains is made too small, a thermal fluctuation problem occurs, which makes it difficult to maintain records at a room temperature. Accordingly, at present, two kinds of magnetic recording media are proposed, in which a recording layer composed of a generally-used continuous magnetic material is cut at portions unable to perform magnetic recording, thereby improving a recording efficiency while maintaining the size of magnetic domains.

In one of the aforementioned two kinds of magnetic recording media, a discrete magnetic recording medium, adjacent recording tracks in a magnetic disk are separated by a non-recording section, thereby decreasing the track pitch while maintaining the track position data (for example, Japanese Patent Laid-Open Publication No. 2003-16621). It is possible to prevent the interference between recording tracks by physically separating the magnetism of recording tracks of a magnetic material and eliminating the effect of the leakage magnetic field of a recording and reproducing head, thereby narrowing the tracks.

In the other kind of magnetic recording medium, a patterned medium, the magnetic particles are regularly arranged in a nonmagnetic base material, and the size of each magnetic particle is regarded as the size of the recording magnetic domain (for example, Japanese Patent Laid-Open Publication No. 2000-251236). In this manner, it is possible to fix the recording positions and to solve the thermal fluctuation problem at the same time. However, highly accurate processing steps are required to regularly arrange magnetic particles having a continuous magnetic property and to process a magnetic material. In particular, the degradation in the size and the direction of the vertical magnetic anisotropy of a recording film is a significant problem. Furthermore, although the head flying height of a recording and reproducing head should be lowered in order to improve the recording efficiency, it is difficult to decrease the flying height, and a number of smoothing steps are required when a patterned medium, which has a number of projections and depressions, is used.

When a discrete magnetic recording medium is used, recording is performed within a recording track having a predetermined width. However, the recording position tends to shift because of a shift in the track direction of the recording and reproducing head within a track. Thus, there is a problem in that the S/N ratio of the recording and reproducing is degraded.

When a patterned medium is used, a good S/N ratio can be obtained since the recording sections are completely separated to always fix the recording positions. However, because the recording sections are separated, there is a problem in that the area that can be used for recording is small, and the intensity of a reproduction signal is low.

SUMMARY OF THE INVENTION

The present invention is proposed in consideration of the aforementioned circumstances, and it is an object of the present invention to provide a magnetic recording medium with a good recording and reproducing S/N ratio and a high reproduction signal intensity, the magnetic recording medium being capable of high-density recording. It is also an object of the present invention to provide a magnetic recording medium substrate for manufacturing such a magnetic recording medium, and a magnetic recording apparatus.

A magnetic recording medium according to a first aspect of the present invention includes: a plurality of recording tracks formed on a substrate, each recording track being formed of a magnetic material; and non-recording sections formed on the substrate, each non-recording section separating adjacent recording tracks, each recording track including a plurality of recording sections and connecting sections for connecting the recording sections adjacent thereto in a track longitudinal direction, and each connecting section having a cross-sectional area in a track width direction that is smaller than a cross-sectional area in a track width direction of adjacent recording sections.

A magnetic recording medium substrate according to a second aspect of the present invention includes: a plurality of protruded portions formed on a substrate, each recording track being in a track shape; and depressed portions formed on the substrate, each depressed portion separating adjacent protruded portions, each protruded portion including a plurality of first portions and second portions for connecting the first portions adjacent thereto in a track longitudinal direction, and each second portion having a cross-sectional area in a track width direction that is smaller than a cross-sectional area in a track width direction of adjacent first portions.

A magnetic recording medium according to a third aspect of the present invention includes: the aforementioned magnetic recording medium substrate; and a magnetic film formed on the magnetic recording medium substrate.

The magnetic recording medium according a fourth aspect of the present invention includes: the aforementioned magnetic recording medium; and a head relatively moves above the magnetic recording medium when a recording or reproducing operation is performed.

DESCRIPTION OF THE EMBODIMENTS

Embodiments of the present invention will be described below with reference to the accompanying drawings.

First Embodiment

Figure 1:
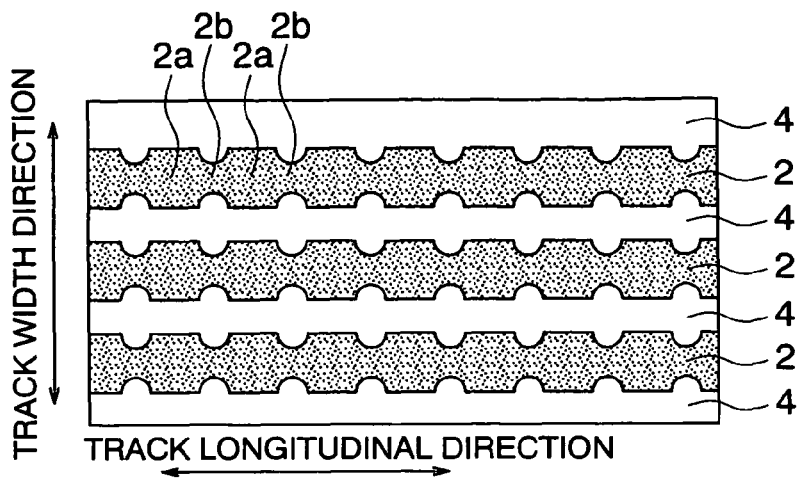
FIG. 1 is a plan view of a magnetic recording medium according to a first embodiment of the present invention.

FIG. 1 shows a plan view of a magnetic recording medium according to a first embodiment of the present invention. The magnetic recording medium in this embodiment includes a plurality of recording tracks 2 formed of a magnetic material on a substrate, which is not shown, and non-recording sections 4 each separating adjacent recording tracks 2. Each recording track 2 includes recording sections 2a, in which recorded information is stored, and connecting sections 2b each connecting adjacent recording sections 2a. Pairs each including a recording section 2a and a connecting section 2b are disposed at regular intervals in a longitudinal direction of the track. One recording section 2a stores a magnetic information item corresponding to a data item "0" or "1".

Figure 2:
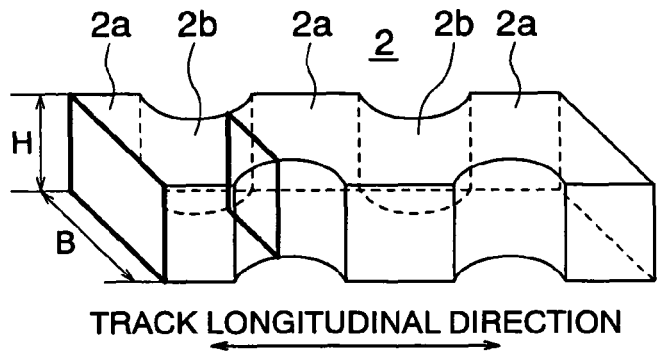
FIG. 2 is a perspective view of a recording track of the magnetic recording medium according to the first embodiment.

FIG. 2 shows a perspective view of one recording track 2. As shown in FIG. 2, the cross sectional area in a direction perpendicular to the track longitudinal direction, i.e., the track width direction, of the connecting section 2b decreases as the distance from one of the adjacent recording sections 2a increases, and increases as the distance to the other recording section 2a decreases. Thus, the cross sectional area becomes the smallest at a substantially central portion of the connecting section 2b. Furthermore, the greatest cross sectional area in the track width direction of the connecting section 2b is adjusted to be substantially the same as the smallest cross sectional area of the recording section 2a. That is to say, the connecting section 2b includes a portion for which the cross sectional area is smaller than the cross sectional area of the recording section 2a. In this embodiment, the smallest cross sectional area of the connecting section 2b is not "0". In the other embodiments described later, the smallest cross sectional area can be "0". Furthermore, in this embodiment, the smallest cross sectional area of the connecting section 2b is at a substantially central portion of the connecting section 2b but can not be at central portion of the connecting section 2b. Where else, the cross-sectional area in the track width direction of each connecting section 2b has a smallest value.

Figure 20:
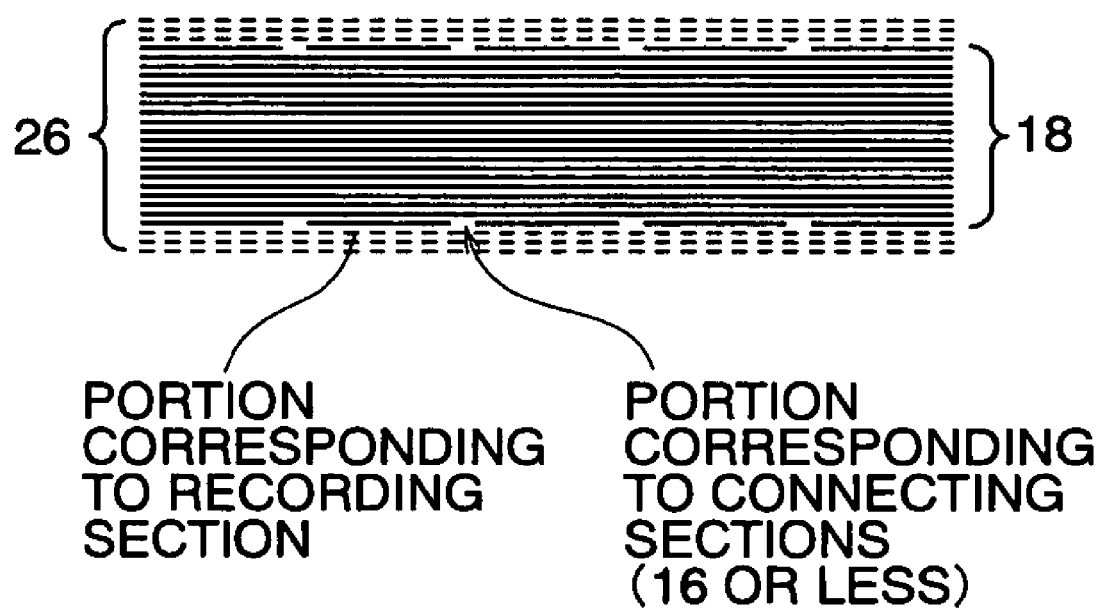
FIG. 20 shows an exposure pattern of portions corresponding to recording sections and connecting sections in a case where an imprint stamper is manufactured.

Moreover, as will be explained in the descriptions of Example 1 later, in the recording medium of this embodiment, the exposure pattern of a resist corresponding to the recording tracks 2 can be obtained by the irradiation with a plurality of electron beams. For example, assuming that an exposure pattern having a track pitch of 260 nm is written with 26 electron beams, and the ratio of the widths of a recording track 2 and a non-recording section 4 is two to one, the number of electron beams used to form the recording tracks is 18. Assuming that a portion corresponding to the recording section and a portion corresponding to the connecting section are formed by changing the width of the electron beam, the width of the portion corresponding to the connecting section should be narrower than the sum of the widths of at least 18 electron beams, as shown in FIG. 20. Accordingly, the width of the portion corresponding to the connecting section becomes the sum of 16 electron beams at maximum. This means that the maximum cross sectional area in the track width direction of the connecting section 2b of the magnetic recording medium in this embodiment should be 8/9 or less of the maximum cross sectional area in the track width direction of the recording section 2a.

In this embodiment, the height of the connecting section 2b measured from the substrate plane is substantially the same as the height H of the recording section 2a, and the size in the track width direction decreases as the distance from one of the two adjacent recording sections 2a increases, and increases as the distance to the other decreases, as shown in FIG. 2. However, as in the case of a modification of this embodiment shown in FIG. 3, the size of the connecting section 2b in the track width direction can be substantially the same as the width B of the recording section 2a, and the height from the substrate plane can decrease as the distance from one of the two adjacent recording sections 2a increases, and increases as the distance to the other recording section 2a decreases. In addition, both the track structure shown in FIG. 2 and the track structure shown in FIG. 3 can be provided.

Figure 4:
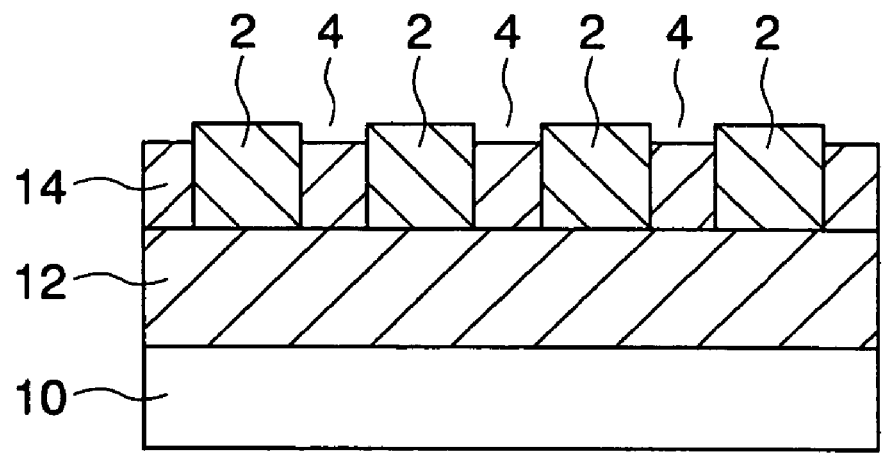
FIG. 4 is a sectional view of the magnetic recording medium of the first embodiment in a track width direction.
Figure 5:
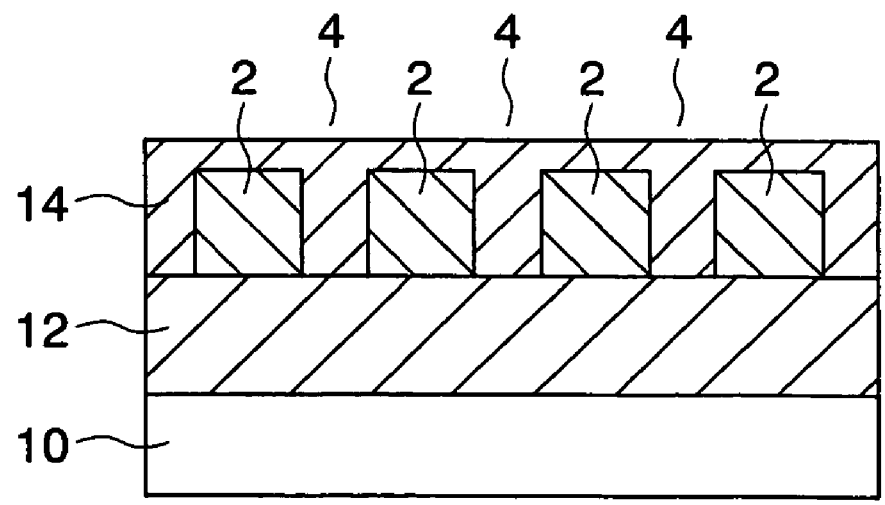
FIG. 5 is a sectional view of a magnetic recording medium according to a second modification of the first embodiment in a track width direction.

FIG. 4 shows a cross sectional view obtained by sectioning the magnetic recording medium of this embodiment in a plane in the track width direction, i.e., in a direction perpendicular to a track longitudinal direction. As shown in FIG. 4, in the magnetic recording medium of this embodiment, a soft magnetic layer 12 is formed on a substrate 10, and a plurality of recording tracks 2 of a magnetic material in a shape of projections are formed on the soft magnetic layer 12. A groove is provided between adjacent recording tracks 2 for magnetically separating the adjacent recording tracks 2, the groove serving as a non-recording section 4. In this embodiment, a protection layer 14 of a nonmagnetic material is filled in the groove serving as the non-recording section 4. As in the case of a second modification of this embodiment shown in a FIG. 5, the protection layer 14 can cover the recording tracks 2.

Figure 6:
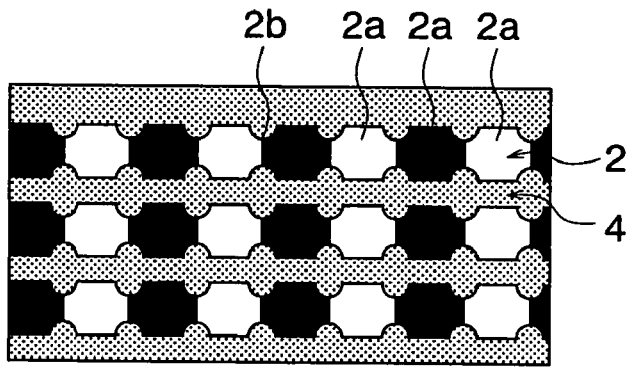
FIG. 6 schematically shows an MFM image of the magnetic recording medium according to the first embodiment.

In the magnetic recording medium of this embodiment thus constituted, each of the connecting sections 2b arranged in the recording track 2 at regular intervals has a portion having a cross sectional area smaller than the cross sectional area of each recording section 2a. Accordingly, even if a recording operation is performed so that a magnetic wall is provided to be slightly shifted from the connecting section 2b in the track longitudinal direction, the magnetic wall moves toward the connecting section 2b since the status of the magnetic wall is more stable when the cross sectional area thereof is smaller. FIG. 6 schematically shows an MFM (Magnetic Force Microscope) image in a case where different data items are stored in adjacent recording section 2a of one recording track 2 in this embodiment. In FIG. 6, one of the date items "0" and "1" is stored in each white-colored recording section 2a, and the other is stored in each black-colored recording section 2a. As can be understood from FIG. 6, magnetic walls are fixed to the connecting sections 2b. As a result, in the magnetic recording medium of this embodiment, when magnetic information items are stored in a recording track 2, they are stored in the recording sections 2a, and the magnetic walls between adjacent magnetic information items move to the connecting sections 2b that are arranged at regular intervals, thereby modifying the recording lengths, which have varied due to the shift in track longitudinal direction of a recording and reproducing head, to constant lengths.

Figure 7:
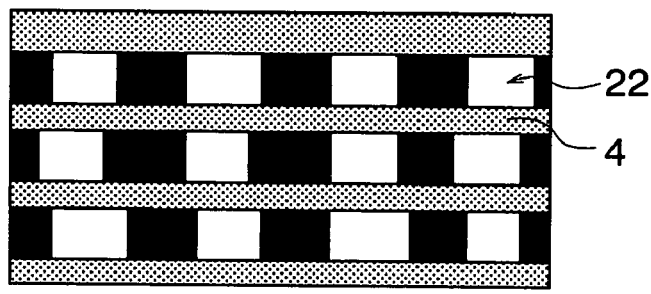
FIG. 7 schematically shows an MFM image of a discrete medium.

As a comparative example, FIG. 7 shows an MFM image in a case where data items "0" and "1" are alternately stored in one of recording tracks 22 of a discrete medium, the recording tracks 22 being separated by non-recording sections 4, and each recording section 22 extending to have a constant cross sectional area. As can be understood from FIG. 7, in this comparative example, when a recording operation is performed so that the magnetic walls are shifted in the track longitudinal direction, the positions of the magnetic walls are not corrected, so that the magnetic walls do not appear at regular intervals.

Accordingly, the S/N ratio of the magnetic recording medium according to this embodiment is improved compared to the comparative example.

Figure 8:
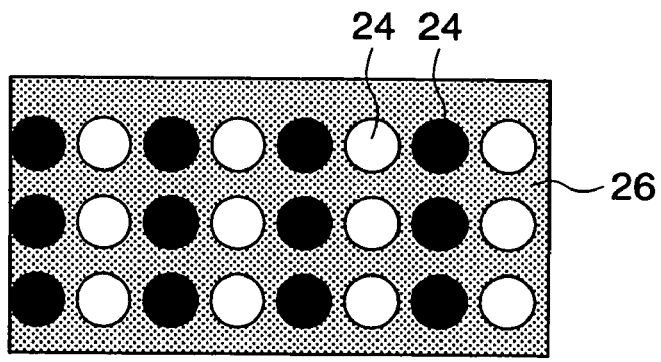
FIG. 8 schematically shows an MFM image of a patterned medium.

For reference, FIG. 8 schematically shows an MFM image in a case where data items "0" and "1" are alternately stored in recording sections 24 of a patterned medium which are separated by a nonmagnetic material 26. In this patterned medium, the S/N ratio is not degraded since the recording sections 24 are magnetically separated from each other by the nonmagnetic material 26.

Figure 9:
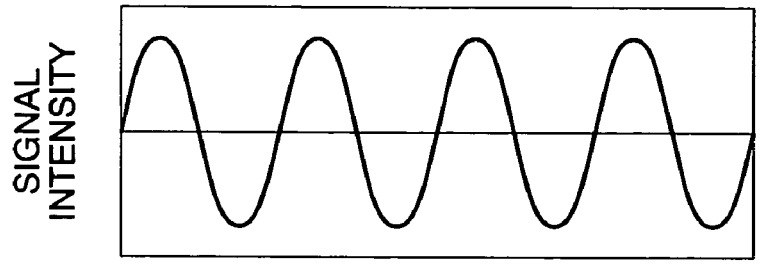
FIG. 9 shows a reproduction signal waveform of the magnetic recording medium according to the first embodiment.
Figure 10:
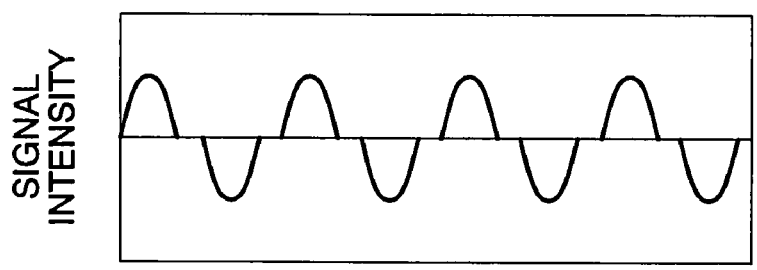
FIG. 10 shows a reproduction signal waveform of a patterned medium.
Figure 11:
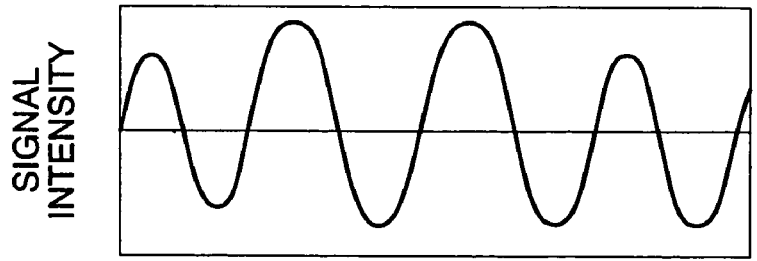
FIG. 11 shows a reproduction signal waveform of a discrete medium.

Furthermore, in this embodiment, since the smallest cross sectional area of each connecting section 2b of the recording track 2 is not 0, the recording sections 2a of the recording track 2 are not completely separated, thereby preventing a decrease in the volume that can be used for the recording. As a result, the signal intensity of the reproduced signal increases in proportion to the volume compared to a case of a patterned medium having the same recording density. Thus, it is possible to satisfactorily reproduce the recorded data as shown in FIG. 9, which shows a reproduction signal in a case where data items "0" and "1" are alternately stored in the recording sections 2a as shown in FIG. 6. For reference, FIGS. 10 and 11 show reproduction signals of a patterned medium in which data items "0" and "1" are alternately recorded in adjacent recording sections, and of a discrete medium of the aforementioned comparative example. As can be understood from FIG. 10, the intensity of the reproduction signal of the patterned medium is lower than that of the reproduction signal of the magnetic recording medium according to this embodiment shown in FIG. 9. Furthermore, as can be understood from FIG. 11, the intensity and the interval of the reproduction signals of the discrete medium are not constant compared to the reproduction signals of the magnetic recording medium according to this embodiment shown in FIG. 9.

The magnetic recording medium according to this embodiment is most effective when the interval between adjacent recording tracks 2 is 200 nm or less, with which the magnetic walls in the recording pattern become unstable. It is preferable that the width of each recording section 2a be 50 to 90% of the track interval, and more preferably, 60% to 80% thereof.

Preferably, the height of each recording track 2 measured from the surface of the soft magnetic layer 12 shown in FIG. 4 is 100 nm or less in order to achieve a stable flying height of the recording and reproducing head, but the height of 1 nm or less is not preferable from the viewpoint of the separation of magnetism.

Furthermore, it is preferable that the ratio of the smallest cross sectional area of the connecting section 2b to the smallest cross sectional area of the recording section 2a be 10% to 90%, more preferably 20% to 80%, and ideally 50% since if it is too high, the magnetic walls are not stably fixed, and if it is too low, the magnetic material volume is impaired, thereby decreasing the signal intensity.

Although it is preferable that both the width and the height of the connecting section 2b be smaller than those of the recording section 2a, there is no problem if only one of them is smaller.

In this embodiment, the substrate is ring-shaped having a hole at the center thereof, and the material of the substrate can be a metal, an alloy or compound thereof, glass, a ceramic material, or an organic material.

An appropriate magnetic material for constituting the recording track is one having great saturation magnetization Is and magnetic anisotropy. From this point of view, it is preferable that the magnetic material contain at least one material selected from the group consisting of Co, Pt, Sm, Fe, Ni, Cr, Mn, Bi, Al and an alloy thereof. It is particularly preferable that the material be a Co-group alloy, especially CoPt—, SmCo—, or CoCr-based alloy in which the crystal magnetic anisotropy is great, or an ordered alloy such as FePt and CoPt. There is no limitation on the thickness of the magnetic material but considering that a high density recording should be performed, the thickness should preferably be 100 nm or less, more preferably 50 nm or less, and further preferably 20 nm or less. However, a thickness of 0.1 nm or less is not preferable since with such a thickness, it is difficult to form a thin film.

The nonmagnetic material can be a metal, glass, a ceramic material, or an organic material that is not a magnetic material. In the case of a metal, it is particularly preferable that the material contains at least one metal selected from the group consisting of Cu, Ti, Mo, Al, and Mg, and an alloy thereof, or that the aforementioned materials are stacked to form a multilayer. In the case of a nonmetal, it is preferable that the material contain $SiO_2$ or C.

The material of the protection layer can be substantially the same as the aforementioned nonmagnetic material, but it is preferable that the differences between the projections and depressions on the surface be 30 nm or less, and more preferably 10 nm or less in order to restrict the flying height of the recording and reproducing head.

As described above, according to this embodiment, it is possible to improve the recording and reproducing S/N ratio, the reproduction signal intensity, and the degree of high density recording.

Furthermore, since the non-recording sections 4 of this embodiment are formed of a nonmagnetic material, adjacent recording tracks are magnetically separated from each other. Accordingly, it is possible to write to the recording tracks without the negative influence of leakage magnetic field of the recording and reproducing head.

Moreover, since the smallest area of the connecting sections of a recording track is not 0 in this embodiment, the area of depressed portions is smaller than that of a patterned medium. As a result, the flattening of the medium is easier and the flying height of a recording and reproducing head can be stabilized at a position relatively low with respect to the medium.

Although the smallest cross sectional area of the connecting sections 2b is not 0 in this embodiment, it can be 0 in some connecting sections. It is preferable that the ratio of the connecting sections in which the smallest cross sectional area is 0 to the entire track be 50% or less. In such a case, it is possible to obtain an effect similar to this embodiment.

Second Embodiment

Figure 12:
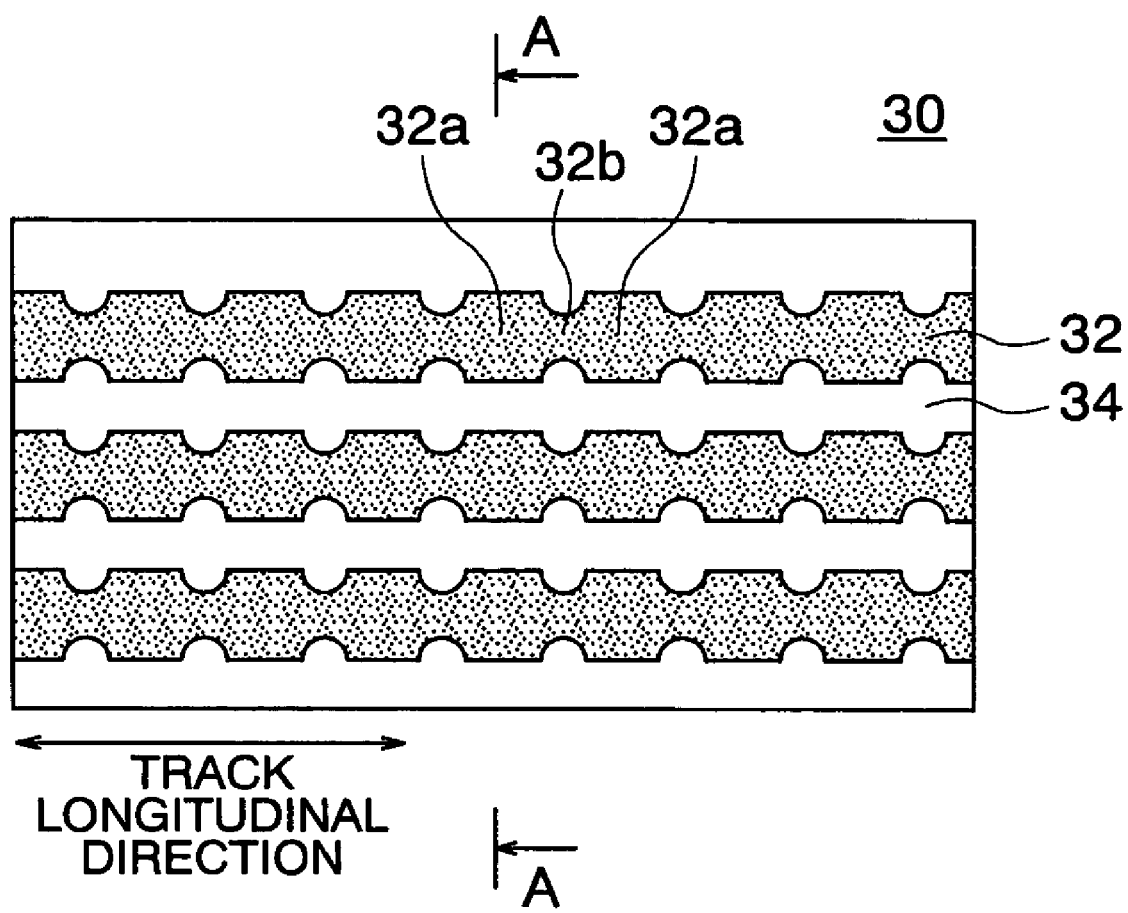
FIG. 12 is a plan view of a magnetic recording medium substrate according to a second embodiment of the present invention.
Figure 13:
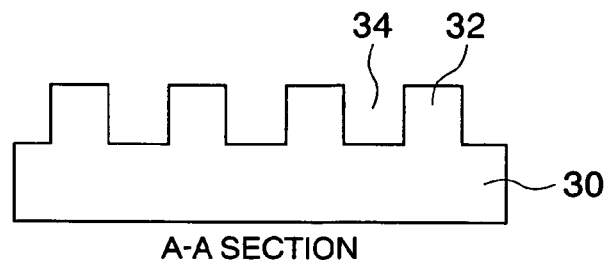
FIG. 13 is a sectional view of the magnetic recording medium substrate according to the second embodiment taken along line A-A of FIG. 12.

Next, a magnetic recording medium substrate according to a second embodiment of the present invention will be described below with reference to FIGS. 12 and 13. FIG. 12 is a plan view of a magnetic recording medium substrate 30 according to this embodiment, and FIG. 13 is a sectional view of the magnetic recording medium substrate 30 of this embodiment taken along the line A-A shown in FIG. 12.

The magnetic recording medium substrate 30 of this embodiment includes protruded portions 32 corresponding to recording tracks, and depressed portions 34 for separating adjacent protruded portions. Each protruded portion 32 includes first portions 32a corresponding to recording sections, and connecting sections 32b for connecting adjacent first portions 32a. Pairs each including one first portion 32a and one second portion 32b are arranged in a track longitudinal direction at regular intervals.

The cross sectional area in a direction perpendicular to the track longitudinal direction, i.e., the track width direction, of the second portion 32b decreases as the distance from one of the adjacent two first portions 32a increases, and increases as the distance to the other first portion 32a decreases. Thus, the cross sectional area becomes the smallest at a substantially central portion of the second portions 32b. Furthermore, the greatest cross sectional area in the track width direction of the second portion 32b is adjusted to be substantially the same as the smallest cross sectional area in the track width direction of the first portion 32a. That is to say, a second portion 32b includes a portion having a smaller cross sectional area than a first portion 32a. In this embodiment, the smallest cross sectional area of the second portions 32b is not "0". However, as explained in the descriptions of the first embodiment, the smallest cross sectional area of some second portions can be "0". In such a case, it is preferable that the ratio of the second portions with the smallest cross sectional area being "0" to the entire second portions be 50% or less.

Figure 14:
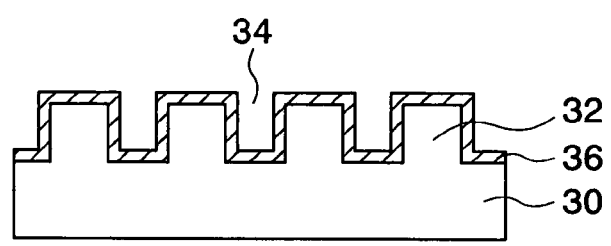
FIG. 14 is a sectional view of a magnetic recording medium in a track width direction, the magnetic recording medium being manufactured using the magnetic recording medium substrate according to the second embodiment.
Figure 15:
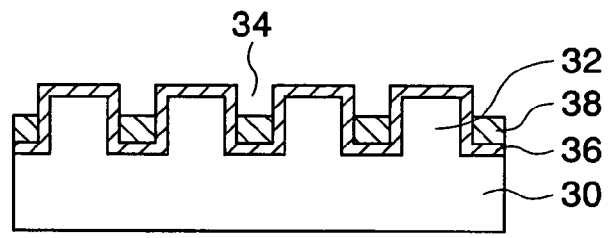
FIG. 15 is a sectional view of a magnetic recording medium in a track width direction, the magnetic recording medium being manufactured using the magnetic recording medium substrate according to the second embodiment.
Figure 16:
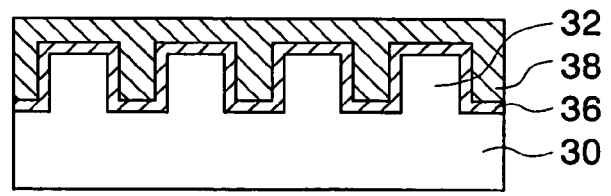
FIG. 16 is a sectional view of a magnetic recording medium in a track width direction, the magnetic recording medium being manufactured using the magnetic recording medium substrate according to the second embodiment.
Figure 17:
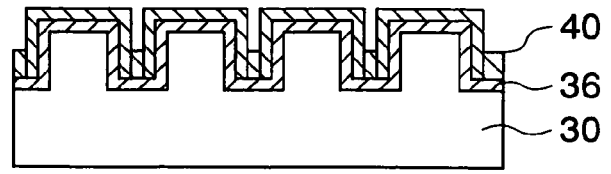
FIG. 17 is a sectional view of a magnetic recording medium in a track width direction, the magnetic recording medium being manufactured using the magnetic recording medium substrate according to the second embodiment.

A magnetic recording medium is formed from the substrate 30 of this embodiment thus constituted by forming a magnetic film 36 on the surface of the substrate 30 by a sputtering method as shown in FIG. 14. At this time, the magnetic film 36 formed on a protruded portion 32 serves as a recording track, and a depressed portion 34 serves as a non-recording section. Thereafter, as shown in FIG. 15, an embedded layer 38 of a nonmagnetic material can be formed in the depressed portions 34. Furthermore, as shown in FIG. 16, the embedded layer 38 can cover the protruded portions 32 serving as the recording tracks. Moreover, as shown in FIG. 17, a protection layer 40 of a nonmagnetic material or a lubricant can be formed on the magnetic film 36. The first portion 32a with the magnetic film 36 corresponds to the recording section of the magnetic recording medium in the first embodiment, and the second portion 32b with the magnetic film corresponds to the connecting section of the magnetic recording medium in the first embodiment. The magnetic recording medium in this embodiment is called a substrate-processed magnetic recording medium, and the magnetic recording medium of the first embodiment is called a magnetic material-processed magnetic recording medium.

As in the case of the first embodiment shown in FIG. 2, the height of the second portion 32b of this embodiment measured from the bottom surface of the depressed portion 34 is substantially the same as the height of the first portion 32a, and the size in the track width direction of the second portion 32b decreases as the distance from one of the two adjacent first portions 32a increases, and increases as the distance to the other first portion 32a decreases. However, as in the case of the modification of the first embodiment shown in FIG. 3, the size of the second portion 32b in the track width direction can be substantially the same as the width of the first portion 32a, and the height of the second portion 32b measured from the bottom surface of the depressed portion 34 can decrease as the distance from one of the two adjacent first portions 32a increases, and increase as the distance to the other first portion 32a decreases. It is also possible that both of the aforementioned structures are provided.

As in the case of the first embodiment, the magnetic recording medium manufactured using the substrate of this embodiment includes a plurality of recording tracks formed of a magnetic material 36 on a substrate 30, and non-recording sections each separating adjacent recording tracks. Each recording track includes recording sections, in which recording information is stored, and connecting sections each connecting adjacent recording sections. A pair of a recording section and a connecting section is disposed at a regular interval in a longitudinal direction of the track. One recording section stores a magnetic information item corresponding to data "0" or "1". The cross sectional area in a direction perpendicular to the track longitudinal direction, i.e., the track width direction, of the connecting section decreases as the distance from one of the adjacent recording sections increases, and increases as the distance to the other recording section decreases. Thus, the cross sectional area becomes the smallest at a substantially central portion of the connecting section. Furthermore, the greatest cross sectional area in the track width direction of the connecting section is adjusted to be substantially the same as the smallest cross sectional area in the track width direction of the recording section. That is to say, the connecting section includes a portion having a smaller cross sectional area than the recording section.

Accordingly, as in the case of the first embodiment, a magnetic recording medium manufactured using the substrate of this embodiment provides a good recording and reproducing S/N ratio, and an improved reproduction signal intensity, and enables a high-density recording.

The magnetic recording medium substrate according to this embodiment is most effective when the interval between adjacent protruded portions 32 is 200 nm or less. It is preferable that the width of the first portion 32a be 50% to 90% of the interval of the protruded portions 32, and more preferably, 60% to 80% thereof.

As in the case of the first embodiment, it is preferable that the height of protruded portions 32 measured from the bottom surface of depressed portion 34 be 100 nm or less in order to achieve a stable flying height of the recording and reproducing head, but the height of 1 nm or less is not preferable from the viewpoint of the separation of magnetism.

Furthermore, preferably the ratio of the smallest cross sectional area of the second portion 32b to the smallest cross sectional area of the first portion 32a is 10% to 90%, more preferably 20% to 80%, and ideally 50% since if it is too great, the magnetic walls are not stably fixed, and if it is too small, the magnetic material area is impaired, thereby decreasing the signal intensity.

Although it is preferable that both the width and the height of the second portion 32b be smaller than those of the first portion 32a, there is no problem if only one of them is smaller.

In this embodiment, the substrate is ring-shaped having a hole at the center thereof, and the material of the substrate can be a metal, an alloy or compound thereof, glass, a ceramic material, or an organic material.

Third Embodiment

Figure 18:
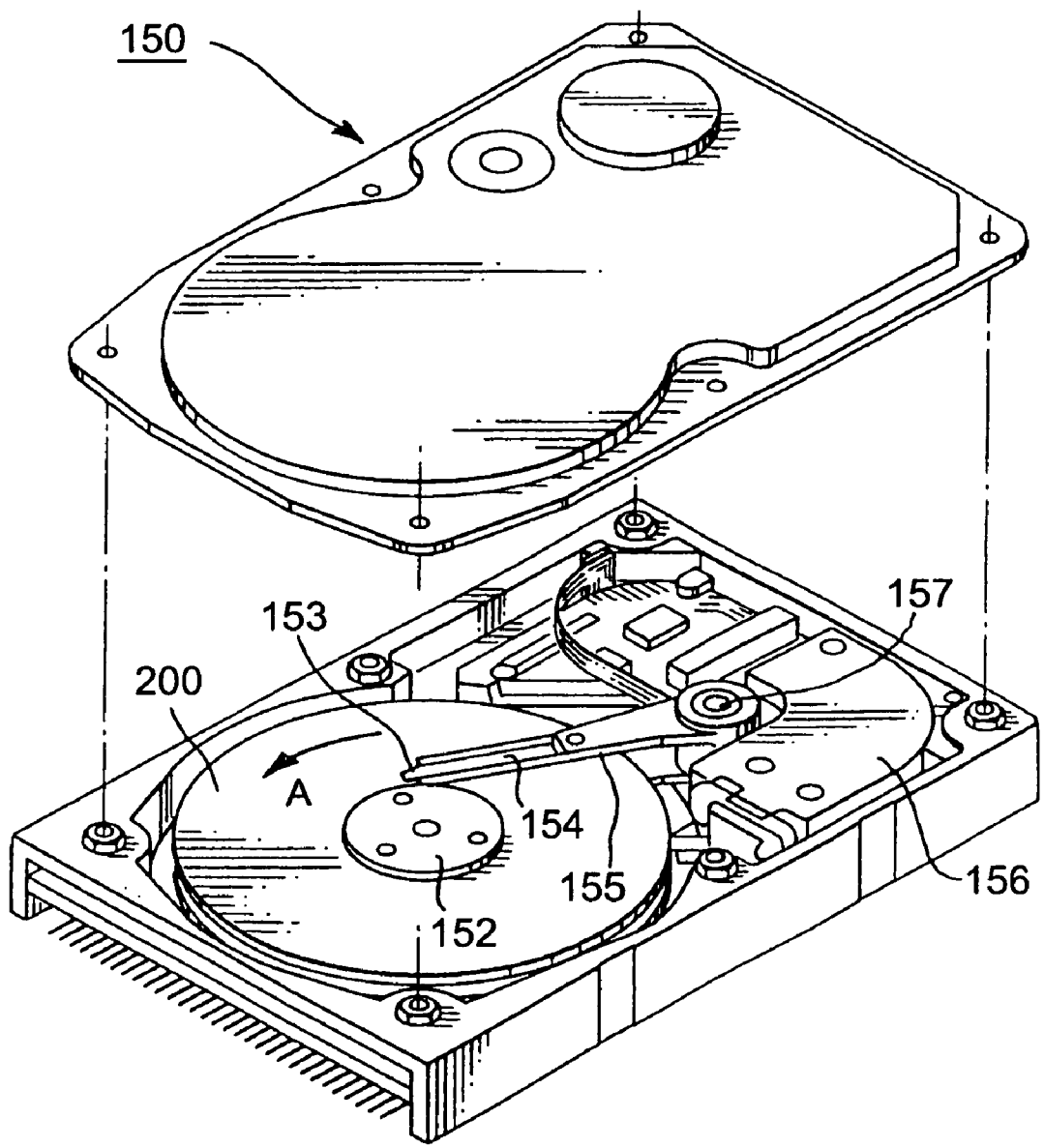
FIG. 18 is a perspective view showing a schematic structure of a main part of a magnetic recording and reproducing apparatus.
Figure 19:
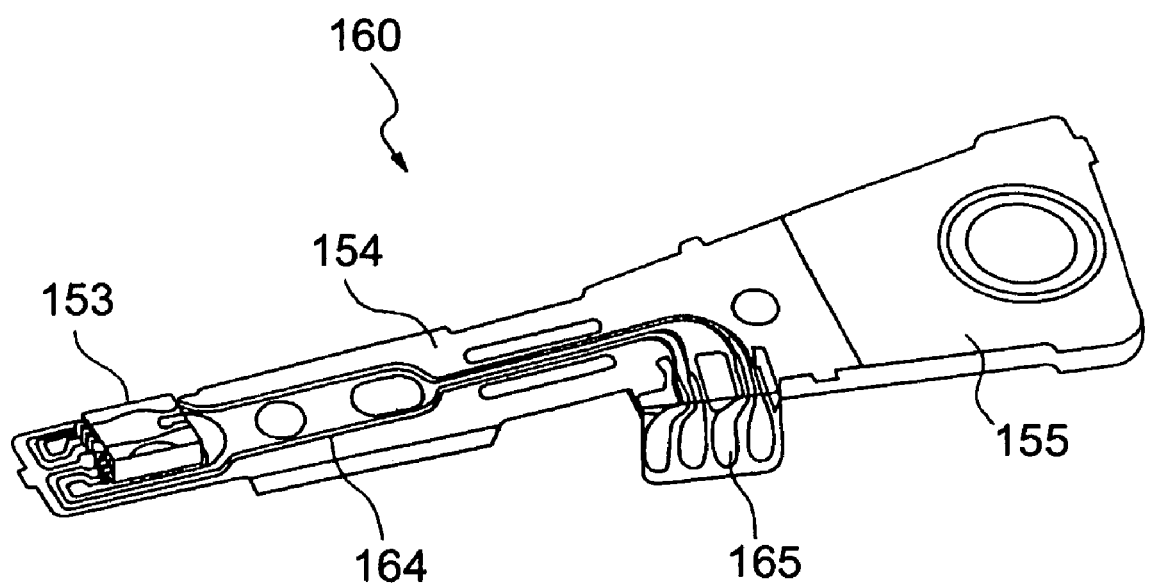
FIG. 19 is an enlarged perspective view of a magnetic head assembly at a portion extending from an actuator arm viewed from the disk side.

Next, a magnetic recording and reproducing apparatus according to a third embodiment of the present invention is shown in FIGS. 18 and 19. In a magnetic recording and reproducing apparatus 150 of this embodiment, a magnetic recording medium according to the first embodiment or the modification thereof or a magnetic recording medium manufactured using the substrate according to the second embodiment is provided.

FIG. 18 is a perspective view schematically showing the structure of a main part of such a magnetic recording and reproducing apparatus. Specifically, a magnetic recording and reproducing apparatus 150 according to this embodiment uses a rotary actuator. In this drawing, a magnetic recording medium 200 for longitudinal recording or perpendicular recording is attached to a spindle 152 and is rotated by a motor (not shown), which is responsive to a control signal sent from a driving apparatus control section (not shown), in a direction indicated by an arrow A. The magnetic recording medium 200 includes a recording layer for longitudinal recording or perpendicular recording. In the magnetic recording medium 200, a head slider 153 for recording information in and reproducing information from the magnetic recording medium 200 is attached to a tip of a suspension 154 in a thin-film shape. The head slider 153 includes at a tip thereof a magnetic head including a magnetoresistive element as a reproducing element.

When the magnetic recording medium 200 is rotated, the air bearing surface (ABS) of the head slider 153 is held with a predetermined flying height with respect to the surface of the magnetic recording medium 200.

The suspension 154 is connected to one end of an actuator arm 155 including a bobbin portion for supporting a driving coil (not shown) and so on. A voice coil motor 156, which is a kind of a linear motor, is provided to the other end of the actuator arm 155. The voice coil motor 156 includes a driving coil (not shown) wound by the bobbin portion of the actuator arm 155 and a permanent magnet and an opposite yoke located so as to be opposite to each other with the driving coil being sandwiched therebetween.

The actuator arm 155 is supported by ball bearings (not shown) provided at the upper and lower portions of a fixed spindle 157, and can be freely rotated and slid by the voice coil motor 156.

FIG. 19 is an enlarged perspective view of a portion of the magnetic head assembly extending from the actuator arm 155, which is viewed from the disk side. Specifically, a magnetic head assembly 160 includes an actuator arm 155 including, for example, a bobbin portion for supporting a driving coil, and a suspension 154 is connected to one end of the actuator arm 155.

A head slider 153 including any of the aforementioned magnetic heads is attached to the tip of the suspension 154. A reproducing head can also be attached. The suspension 154 has lead wires 164 for reading and writing signals. The lead wires 164 are electrically connected to electrodes of the magnetic head incorporated into the head slider 153. In the drawing, the reference numeral 165 denotes an electrode pad of the magnetic head assembly 160.

In the magnetic recording and reproducing apparatus according to this embodiment, the cycle of the recording units of the recording and reproducing head is the cycle of the recording section of the recording track of the magnetic recording medium 200. Furthermore, as explained in the descriptions of the first embodiment, the magnetic walls serving as the boundaries of recording items exist in the connecting sections periodically arranged in the magnetic recording medium used in the magnetic recording and reproducing apparatus of this embodiment. Accordingly, the S/N ratio at the time of the reading of information is improved. As a result, in the magnetic recording and reproducing apparatus of this embodiment, the reciprocal of the frequency of recorded data is equal to (the number of revolutions of the magnetic recording medium 200)×(the length of a recording track)/(the interval of adjacent connecting sections).

EXAMPLES

Hereinafter, examples of the present invention will be described.

Example 1

A magnetic recording medium obtained by Example 1 of the present invention will be described below. The magnetic recording medium of this example is a magnetic material-processed recording medium having a diameter of 2.5 inches manufactured according to the first embodiment. The track pitch thereof is 85 nm, the interval between the recording section and the connecting section at the position 14 mm from the center of the recording medium having a diameter of 2.5 inches is 12 nm. The number of revolutions of medium in the magnetic recording apparatus, to which the recording medium of Example 1 is mounted, is set to be 4,200 rpm, and the recording frequency is set to be 500 MHz. As a result, the arrangement cycle of the recording sections and the connecting sections at the innermost circumference, i.e., the radius position of 14 mm is 12 nm, which corresponds to 2 MFCI (Mega Flux Changes per Inches).

The magnetic recording medium of this example is manufactured by an imprinting method using an imprint stamper. A method of manufacturing a magnetic recording medium of this example will be described below with reference to FIGS. 21A to 27D.

First, a method of manufacturing an imprint stamper will be described with reference to FIGS. 21A to 23.

Figure 21A:
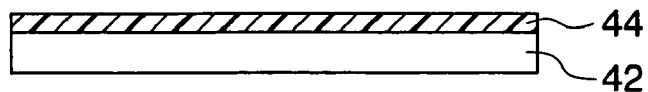
FIGS. 21A to 21G are sectional views showing steps of a process of manufacturing an imprint stamper.

As shown in FIG. 21A, a resist is diluted two times with anisole, filtered by a membrane filter having a thickness of 0.2 μm, and spin coated on a silicon substrate 42. Immediately after this, the workpiece is pre-baked at a temperature of 200° C. for three minutes, thereby obtaining a resist 44 having thickness of 0.1 μm.

Figure 3:
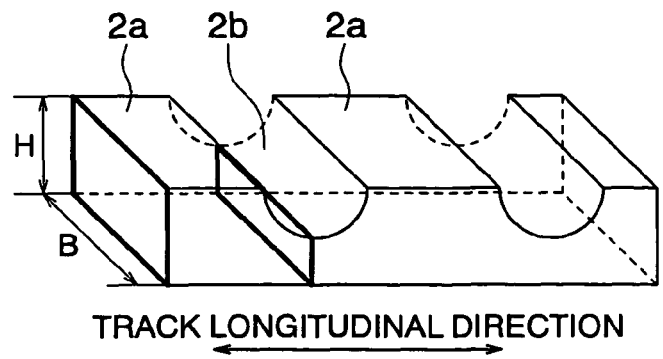
FIG. 3 is a perspective view of a recording track of a magnetic recording medium according to a first modification of the first embodiment.
Figure 21B:
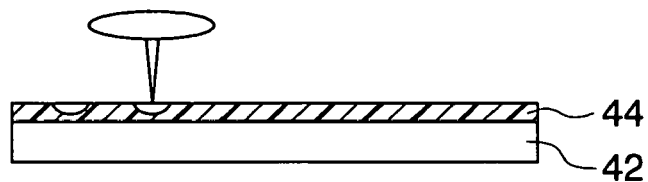
Figure 22:
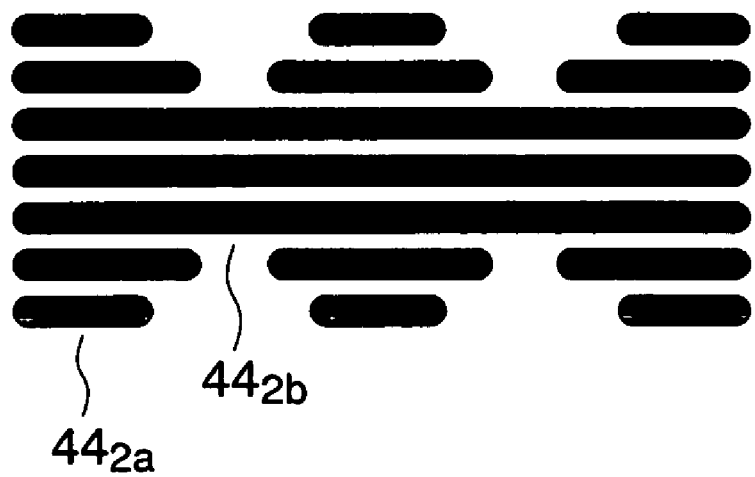
FIG. 22 shows a first example of an exposure pattern when an imprint stamper is manufactured.
Figure 23:
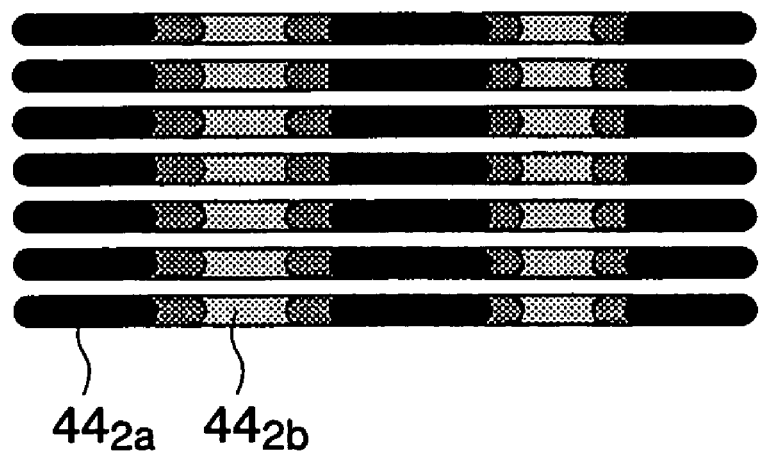
FIG. 23 shows a second example of an exposure pattern when an imprint stamper is manufactured.

Thereafter, a pattern of the recording tracks 2 and the non-recording sections 4 shown in FIG. 1 is exposed by using a lithography machine, by which the pattern is transferred to the resist 44 (FIG. 21B). The exposure pattern at this time is shown in FIG. 22. In FIG. 22, a blackened portion is a trace of an electron beam radiation. An exposure pattern including portions $44_{2a}$ corresponding to the recording sections $2a$ and portions $44_{2b}$ corresponding to the connecting sections $2b$ is formed by irradiating the workpiece with a plurality of electron beams. FIG. 22 shows an exposure pattern in a case where the shape of a recording track 2 is as shown in FIG. 2. When the shape of a recording track 2 is as shown in FIG. 3, an exposure pattern can be obtained by differentiating the exposure intensities between the portions $44_{2a}$ corresponding to the recording sections $2a$ and the portions $44_{2b}$ corresponding to the connecting sections $2b$, as shown in FIG. 23.

Figure 21C:
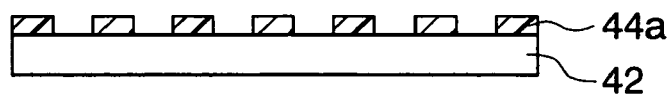

After the exposure, the substrate 42 is immersed in a developing solution to develop it, then in a rinse agent, and blow dried, thereby obtaining a resist master including a resist pattern 44a (FIG. 21C).

Figure 21D:
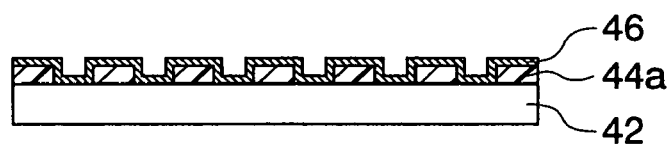

Next, as shown in FIG. 21D, a thin conductive film 46 is formed on the resist master by a sputtering method. Pure nickel is used as a target, and the sputtering is performed in a chamber, which has once been vacuumed until $8 \times 10^{-3}$ Pa and then filled with argon gas until a pressure reaches 1 Pa, with a DC power of 400 W in order to obtain the conductive film 46.

Figure 21E:
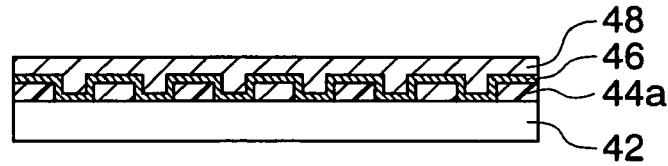

Thereafter, the resist master with the conductive film 46 is electroformed, thereby forming an electroformed film 48 (FIG. 21E).

Figure 21F:
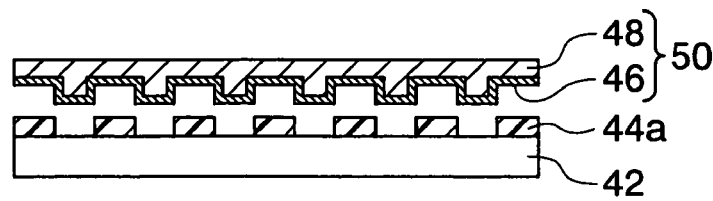
Figure 21G:
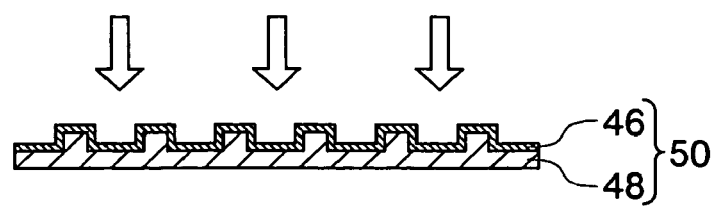

Then, the electroformed film 48 is removed from the resist master, thereby obtaining a stamper 50 including the conductive film 46, the electroformed film 48, and a resist residue (FIG. 21F). Subsequently, the resist residue is removed by an oxygen plasma ashing method (FIG. 21G). As a result, a further stamper 50 including the conductive film 46 and the electroformed film 48 is obtained. Thereafter, an unnecessary portion of the stamper obtained is punched out by using a metal blade, thereby obtaining an imprint stamper.

Then, the stamper 50 is ultrasonic cleaned with acetone, and is immersed for 30 minutes in a solution obtained by diluting fluoroalkylsilane $(CF_3(CF_2)_7CH_2CH_2Si(OMe)_3)$ (GE Toshiba Silicones Co., Ltd., Product Number TSL8233) in ethanol to a concentration of 5% in order to improve the mold-releasing property. Thereafter, the solution remaining on the workpiece is blown with a blower, and the workpiece is annealed at a temperature of 120° C. for one hour.

Figure 24:
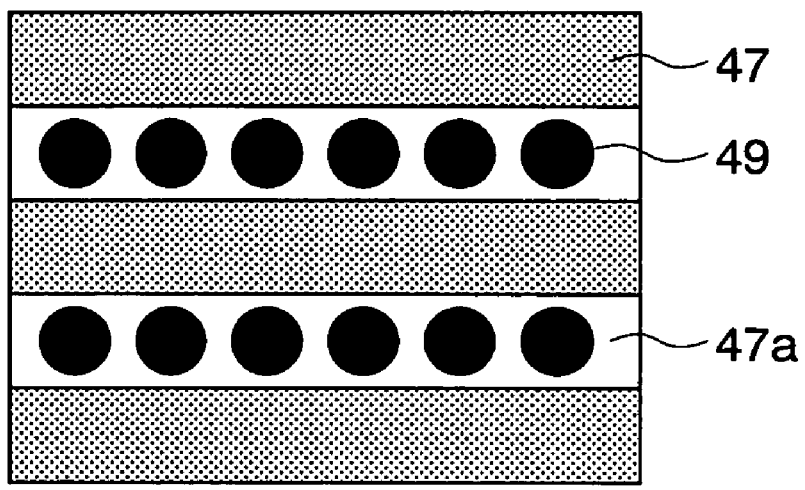
FIG. 24 is a drawing for explaining a method of manufacturing an imprint stamper.
Figure 25:
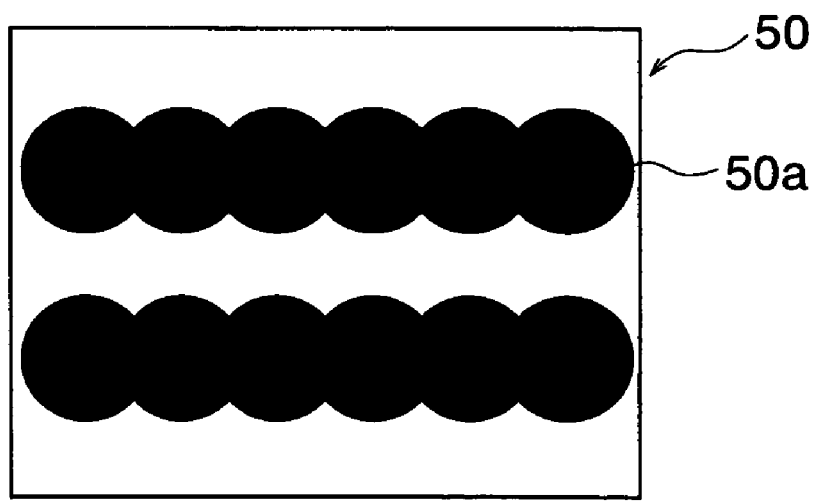
FIG. 25 is a plan view of an imprint stamper manufactured by the method shown in FIG. 24.

The stamper 50 can be obtained by arranging, in grooves 47a of a resist pattern 47 as shown in FIG. 24, a diblock polymer 49 forming a sea-island structure with a phase separation similar to that of PS-PMMA (Polystyrene-Polymethylmethacrylate), and by performing an etching operation using it as a mask to form a pattern on the stamper. Although the islands are separated in the arrangement of polymer according to the phase separation, it is possible to form a pattern 50a shown in FIG. 25 by connecting adjacent islands during the etching step.

Figure 26A:
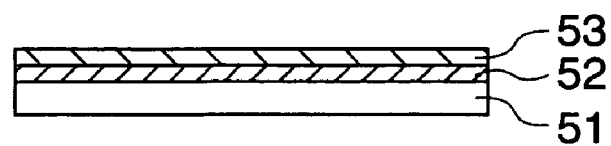
FIGS. 26A to 26D are sectional views showing steps of a process of manufacturing a magnetic recording medium according to Example 1 of the present invention.
Figure 26B:
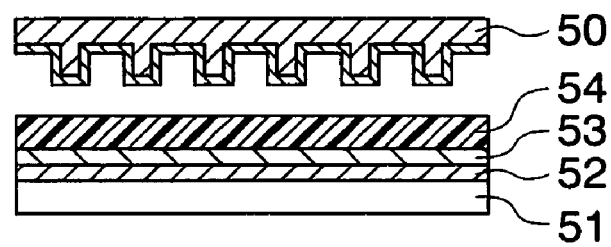
Figure 26C:
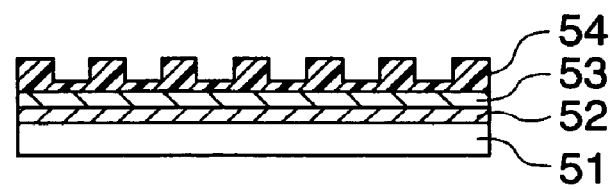

Next, a method of manufacturing a magnetic material-processed magnetic recording medium using the stamper 50 will be described below. As shown in FIG. 26A, a substrate obtained by forming a magnetic film 52 of CoCrPt on a substrate to be processed 31 of ring-shaped glass having diameter of 2.5 inches is prepared, a protection layer 53 of carbon is formed on the magnetic film 52, and a resist is spin coated on the protection layer 53 to have a thickness of 100 nm, thereby forming a resist film 54. Subsequently, position alignment of the stamper 50 with respect to the substrate to be processed 51 is performed (FIG. 26B), and the stamper 50 is pressed, thereby transferring the pattern of the stamper 50 to the resist film 54 (FIG. 26C). Ultraviolet light is irradiated on the resist film 54, on which the pattern had been transferred, to harden it, and a heat treatment is performed.

Figure 26D:
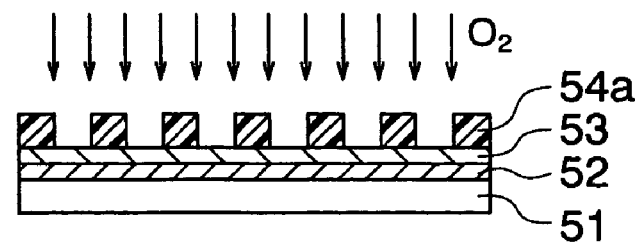

Then, oxygen RIE is performed on the resist film 54 of the substrate, on which the imprinting had been performed as described above, using ICP (Inductively Coupled Plasma) etching equipment at an etching pressure of 2 mTorr, thereby forming a resist pattern 54a (FIG. 26D).

Figure 27A:
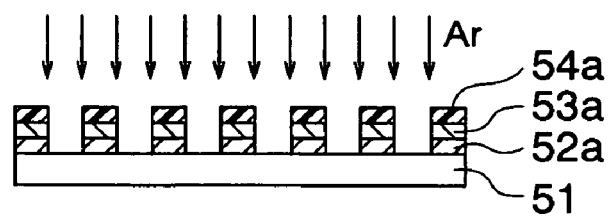
FIGS. 27A to 27D are sectional views showing steps of the process of manufacturing a magnetic recording medium according to Example 1 of the present invention.

Subsequently, the protection layer 53 and the magnetic film 52 are etched by performing Ar ion milling using the resist pattern 54a as a mask, thereby forming a discrete magnetic film 52a, on which the protection layer 53a is formed (FIG. 27A). After the magnetic film 52a is formed, the resist pattern 54a having been used as an etching mask is removed by performing oxygen RIE, thereby exposing the protection layer 53a. At this time, the height of the magnetic film 52a from the substrate 51 is from 5 nm to 50 nm. The protection layer 53a can be removed at the same time as the resist pattern 54a to expose the magnetic film 52a.

Figure 27B:
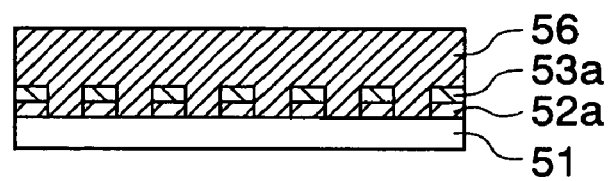

When the height of the magnetic film 52a is 10 nm or more, a nonmagnetic material layer 56 is deposited so as to cover the magnetic film 52a and the protection layer 53a as shown in FIG. 27B. The nonmagnetic material can be $SiO_2$, C, Cu, Al, Ti or the like.

Figure 27C:
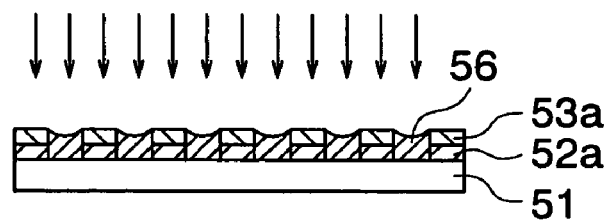
Figure 27D:
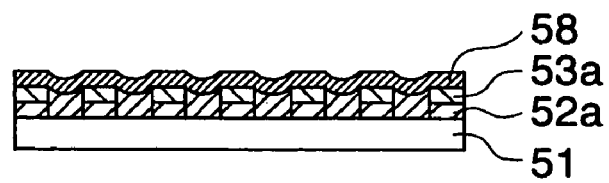

Subsequently, the magnetic material layer 56 is etched back to expose the surface of the protection layer 53a or the magnetic film 52a (FIG. 27C). Thereafter, as shown in FIG. 27D, a protection layer 58 of, for example, carbon is deposited on the entire surface of the workpiece. Then, abnormal projections are removed with tape varnish, and a lubricant is applied to have a thickness of 1 nm by a dipping method, thereby completing a magnetic material-processed magnetic recording medium.

The magnetic recording medium of this example has a servo having a concentric circular shape, an address, a preamble, recording tracks, and non-recording sections.

Example 2

Next, a magnetic recording medium according to Example 2 of the present invention will be described below. The magnetic recording medium of this example is a substrate-processed recording medium manufactured by using a magnetic recording medium substrate according to the second embodiment, and has the same size as recording medium according to Example 1.

The substrate of the magnetic recording medium according to this example is manufactured by an imprinting method. A method of manufacturing a magnetic recording medium according to this example will be described below with reference to FIGS. 28A to 29D.

Figure 28A:
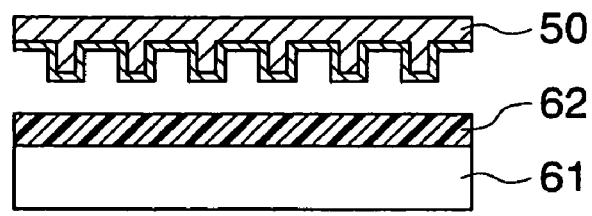
FIGS. 28A to 28D are sectional views showing steps of a process of manufacturing a magnetic recording medium according to Example 2 of the present invention.
Figure 28B:
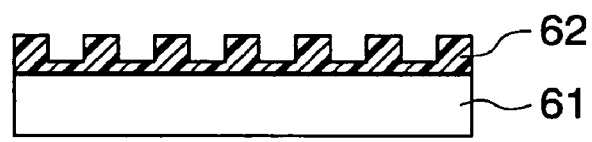

A glass substrate 61 of a disk shape is prepared (FIG. 28A), on which an SOG layer 62 is formed by spin coating SOG (Spin-On-Glass). An imprinting operation is performed on the glass substrate 61 by using the stamper 50 of Example 1, thereby transferring a pattern of the SOG layer 62 (FIGS. 28A and 28B). Instead of SOG, an alcohol dispersion containing $Al_2O_3$ or $TiO_2$ can be used.

Figure 28C:
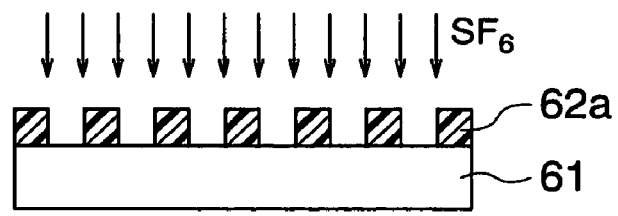
Figure 28D:
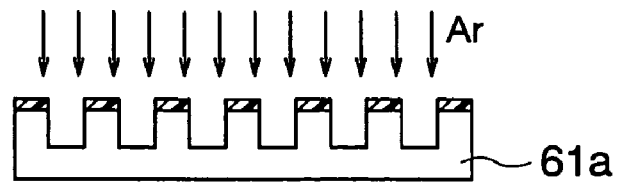

Next, a reactive etching treatment is performed on the workpiece using a fluorine containing gas (for example, $SF_6$) to remove the residue of SOG remaining at the bottom of the depressed portions of the transferred pattern, thereby forming an SOG pattern 62a (FIG. 28C). Subsequently, an ion milling treatment using Ar is performed using the SOG pattern 62a as a mask to process the glass substrate 61, thereby obtaining a processed substrate 61a (FIG. 28D).

Figure 29A:
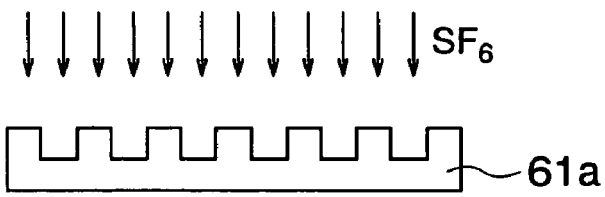
FIGS. 29A to 29D are sectional views showing steps of a process of manufacturing a magnetic recording medium using a magnetic recording medium substrate according to Example 2 of the present invention.
Figure 29B:
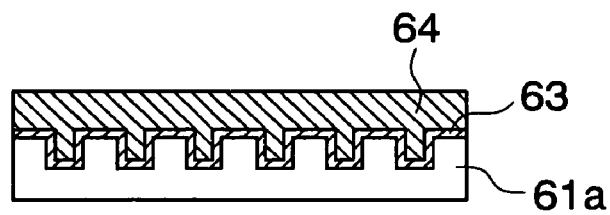

Next, as shown in FIG. 29A, the SOG pattern 62a on the processed substrate 61a is removed using $SF_6$. Thereafter, the sputtering deposition of CoCrPt is performed on the processed substrate 61a to form a magnetic film 63, and the projections and depressions of the substrate 61a are covered with a nonmagnetic film 64 of a nonmagnetic material such as $SiO_2$, C, Cu, Al, Ti or the like using a sputtering method (FIG. 29B).

Figure 29C:
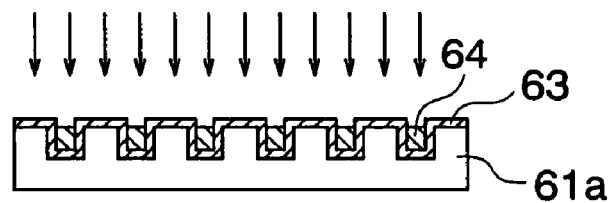
Figure 29D:
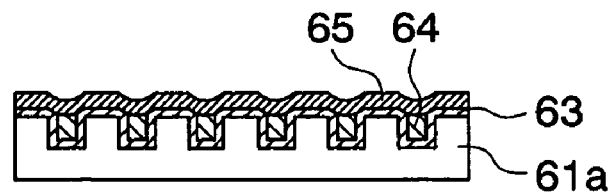

Then, as shown in FIG. 29C, the nonmagnetic film 64 is etched back to expose the magnetic film 63 on the protruded portions of the substrate 61a. Thereafter, a protection layer 65 of carbon is deposited by using a sputtering method (FIG. 29D). Then, abnormal projections are removed with tape varnish, and a lubricant is applied, thereby completing a magnetic recording medium of this example.

Example 3

Next, a method of manufacturing a magnetic recording medium according to Example 3 of the present invention will be described below with reference to FIGS. 30A to 31D. In the manufacturing method of this example, a mask for processing a magnetic material is formed by using a diblock polymer. A magnetic recording medium manufactured by this manufacturing method becomes a magnetic material-processed recording medium of the first embodiment.

Figure 30A:
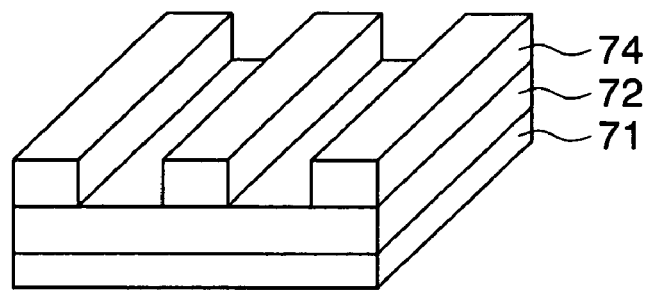
FIGS. 30A to 30C are perspective views showing steps of a process of manufacturing a magnetic recording medium according to Example 3 of the present invention.

As shown in FIG. 30A, a magnetic film 72 is formed on a substrate 71, and a resist pattern 74 including grooves in a track shape having a constant cross sectional area and a width ranging from 20 nm to 150 nm is formed on the magnetic film 72.

Figure 30B:
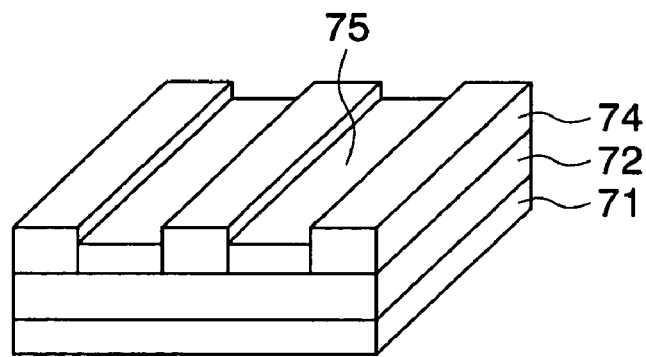
Figure 30C:
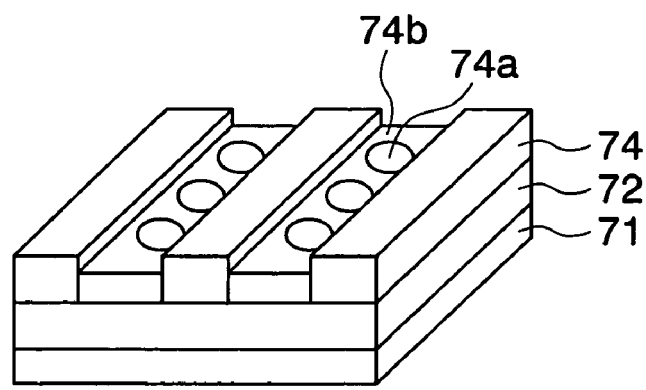

Subsequently, a diblock polymer 75 of PS-PMMA (Polystyrene-Polymethylmethacrylate) dissolved in PGMEA (Propylene Glycol Monomethylether Acetate) is applied to the grooves in track shape of the resist pattern 72 by a spin coating method (FIG. 30B). Thereafter, an annealing treatment is performed on the workpiece at a temperature of 180° C. in an $N_2$ atmosphere containing $H_2$ at a concentration of 1 to 3%. After this treatment, the diblock polymer 74 has a sea-island structure in which islands 74a of PMMA are arranged at regular intervals in a sea 74b of PS (Polystyrene) (FIG. 30C).

Figure 31A:
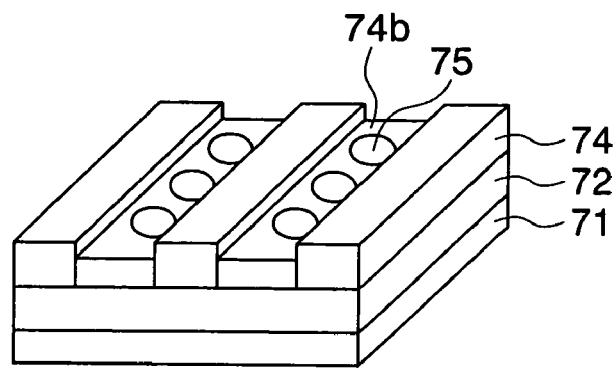
FIGS. 31A to 31D are perspective views showing steps of the process of manufacturing a magnetic recording medium according to Example 3 of the present invention.
Figure 31B:
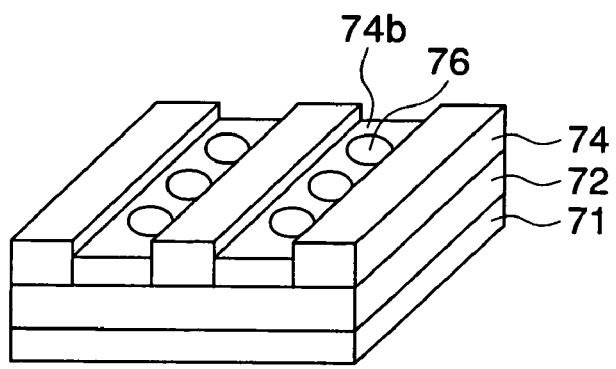

Subsequently, a reactive ion etching using $O_2$ was performed. Since the etching rate of the PS 74b is different from that of the PMMA 74a, only the portions corresponding to the PMMA 74a are etched to form holes 75, as shown in FIG. 31A. Subsequently, as shown in FIG. 31B, the holes 75 are filled with SOG 76.

Figure 31C:
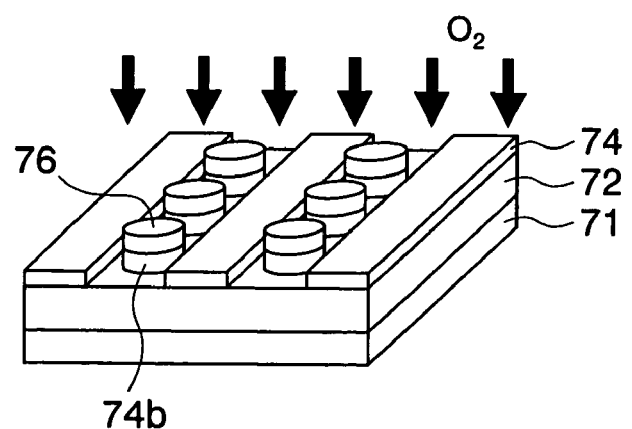
Figure 31D:
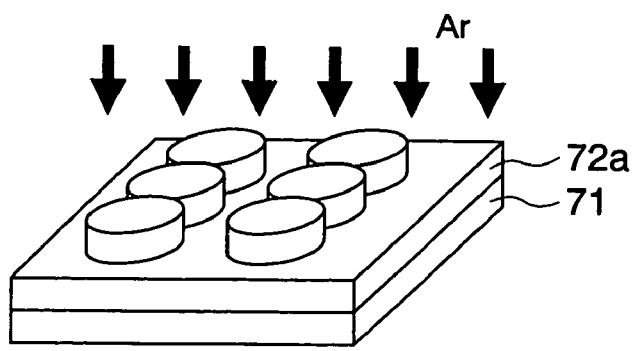

Then, as shown in FIG. 31C, reactive ion etching using $O_2$ is performed using the SOG 76 as a mask, thereby etching and removing the resist pattern 74 and the PS 74b in the portions where the SOG 76 are not formed. Subsequently, the magnetic film 72 is patterned with Ar gas using the remaining SOG 76 and the PS 74b located underneath as masks, and then the SOG 76 and the PS 74b located underneath are removed to obtain a patterned magnetic film 72a shown in FIG. 31C. Thereafter, as explained in the descriptions of Example 1, a nonmagnetic layer and a protection layer are formed to complete the magnetic recording medium.

Although the tracks of this example are formed by an imprinting method, a lithography technique using electron beams can also be used.

It is possible to form a pattern in which the sea and the islands are reversed from those of this example by changing the composition ratio between PS and PMMA in the diblock polymer. In such a case, the portions other than the islands are used as tracks.

In contrast to the aforementioned examples, magnetic recording mediums are manufactured in accordance with the following Comparative Examples 1 and 2.

As Comparative Example 1, a discrete magnetic recording medium is manufactured, which has the same size as Example 1 except for the tracks, the width of which is constant. As Comparative Example 2, a patterned medium is manufactured in which the size and the recording density are the same as those of Example 1.

A read/write (R/W) test was performed by mounting the magnetic recording media according to Examples 1 to 3 and the recording media according to Comparative Examples 1 and 2 on the magnetic recording and reproducing apparatus according to the third embodiment, writing signals using a magnetic monopole head as a write head, and reading signals using a GMR head as a reproducing head. As the measurement condition, the magnetic recording medium was rotated at 4,200 rpm at the radius position of 14 mm from the center. The outputs of 2 MFCI signals are shown below. With respect to the medium S/N ratio (S/Nm), S value is a half value of a pp value (difference between the positive and negative greatest values) at the time of one magnetization reversal of a solitary wave at 10 kFCI, and Nm value is a rms (root mean square) value of noise at 2 MFCI. In addition, the head flying property at the medium surface was also evaluated using an AE sensor.

The obtained results are shown in the following table.

TABLE 1

|  | Output (mV) | S/Nm (dB) | Flying Stability |
| --- | --- | --- | --- |
| Example 1 | 1.05 | 24.9 | Excellent |
| Example 2 | 1.08 | 24.0 | Excellent |
| Example 3 | 0.74 | 25.3 | Good |
| Comparative Example 1 | 1.10 | 21.9 | Excellent |
| Comparative Example 2 | 0.58 | 25.6 | Fair |

From the above comparison results, it can be understood that the outputs of the magnetic recording media according to Examples 1 to 3 are greater compared to the output of a patterned medium according to the Comparative Example 2, and the S/N ratios thereof are better compared to a discrete medium according to Comparative Example 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

The invention claimed is:

1. A magnetic recording medium comprising:
    a plurality of recording tracks formed on a substrate, each recording track being formed of a magnetic material; and
    non-recording sections formed on the substrate, each non-recording section separating adjacent recording tracks,
    each recording track including a plurality of recording sections and connecting sections for connecting the recording sections adjacent thereto in a track longitudinal direction, the connecting sections being arranged at regular intervals, each connecting section having a cross-sectional area in a track width direction that is smaller than a cross-sectional area in a track width direction of adjacent recording sections, and magnetic walls between adjacent magnetic information items being in connecting sections and not in recording sections, wherein each of the recording sections have a substantially constant width in a track width direction, and wherein a smallest cross-sectional area in the track width direction of the connecting section is greater than 0.

2. The magnetic recording medium according to claim 1, wherein the cross-sectional area in the track width direction of each connecting section has a smallest value.

3. The magnetic recording medium according to claim 2, wherein the cross-sectional area in the track width direction of each connecting section decreases as a distance from one of the two adjacent recording sections increases until the cross-sectional area reaches the smallest value, and then increases as a distance to the other recording section decreases.

4. The magnetic recording medium according to claim 1, wherein pairs each including one recording section and one connecting section are periodically arranged in a track longitudinal direction.

5. The magnetic recording medium according to claim 1, wherein a size in the track width direction of the connecting section is smaller than a size in the track width direction of the recording section.

6. The magnetic recording medium according to claim 1, wherein a height of the connecting section is smaller than a height of the recording section.

7. The magnetic recording medium according to claim 1, wherein the non-recording section contains a nonmagnetic material.

8. The magnetic recording medium according to claim 1, wherein a cross-sectional shape of the recording track in the track width direction is a convex shape, and a cross-sectional shape of the non-recording section in the track width direction is a concave shape.

9. A magnetic recording medium comprising:
    a magnetic recording medium substrate according to claim 8; and
    a magnetic film formed on the magnetic recording medium substrate.

10. A magnetic recording and reproducing apparatus comprising:
    a magnetic recording medium according to claim 1; and
    a head relatively moves above the magnetic recording medium when a recording or reproducing operation is performed.

* * * * *